United States Patent
Schoendorfer et al.

[15] 3,655,539

[45] Apr. 11, 1972

[54] SOLUBLE CHROMATE PURIFICATION BY ELECTROLYSIS

[72] Inventors: George F. Schoendorfer, Atlanta, Ill.; Roger J. Morschhauser, Cleveland, Ohio; Thomas S. Gardner, Painesville; Donald L. Thompson, Perry, Ohio

[73] Assignee: Diamond Shamrock Corporation, Cleveland, Ohio

[22] Filed: Feb. 15, 1967

[21] Appl. No.: 616,165

[52] U.S. Cl. ..........................................204/128, 204/130
[51] Int. Cl. .......................................C01b 7/06, C01d 7/34
[58] Field of Search .................... 204/128, 130, 89, 267, 269

[56] References Cited

UNITED STATES PATENTS

| | | | |
|---|---|---|---|
| 3,324,023 | 6/1967 | Kircher | 204/256 |
| 3,324,024 | 6/1967 | Portman | 204/269 |
| 3,444,478 | 8/1969 | Carlin | 204/130 |

Primary Examiner—John H. Mack
Assistant Examiner—R. L. Andrews
Attorney—C. Thomas Cross, Roy Davis, Dick M. Warburton, John J. Freer and Timothy E. Tinkler

[57] ABSTRACT

The halide content of chromate solutions is reduced by subjecting the impure solutions to electrolysis in a diaphragmless electrolytic cell whereby, at least a portion of said halide is converted to gaseous halogen which may then be readily separated from the aqueous chromate solution.

8 Claims, No Drawings 3,655,539

SOLUBLE CHROMATE PURIFICATION BY ELECTROLYSIS

BACKGROUND OF THE INVENTION

It is well known that halides, especially chlorides, are generally present as an impurity in soluble chromates such as alkali metal chromates and bichromates, usually in the form of alkali metal halides, having been introduced as an impurity during the production of the chromate, e.g., from the alkaline material used in the roasting of the original chrome ore, the raw water used to leach the chromate values from the roasted ore, the acid used to neutralize the alkaline chromates if bichromate is to be the end product, etc. That the level of the halide impurity becomes high enough to be detrimental in many of the end use applications to which the chromates are put, is largely due to the fact that most of the halide remains in solution in the mother liquor from which the chromate values are only partially removed by crystallization, thereby allowing the halide content of the mother liquor to increase to a significant level on a chromate basis. Further, in the production of alkali metal bichromates, while most of the liquor remaining after crystallization is sold as is or converted to chromic acid, a portion of same is recycled through the chromate acidification and bichromate crystallization steps thereby permitting an even greater build-up of halide impurity.

Various attempts have been made in the past to eliminate or reduce this problem. One method practiced has been the periodic purging of the chromate-containing mother liquor, in which an excessive build-up of chloride ions has occurred, from the crystallization process to another process wherein a lower grade chromium chemical is produced, such as chrome tanning agents, and where chloride impurities are unobjectionable. Obviously this practice is undesirable and should hence be kept to a minimum since it entails the conversion of a portion of the chromate values to chrome compounds which are not as attractive, economically, to a manufacturer. In a second method, it has been proposed to remove the halide impurity by precipitation from solution with silver ions. While effective, this method has not seen widespread use due to its inconvenience and lack of economy. More specifically, it is necessary to determine before treatment the exact quantity of halide present in order that an amount of silver sufficient to substantially completely remove the halide be used without introducing such a quantity that silver chromate will be precipitated. Further, due to the expense of the silver, it is required that the silver halide be recovered in order that the silver may be reclaimed and recycled to the process.

SUMMARY OF THE INVENTION

An object of the present invention is to provide a new process for reducing the halide content of aqueous chromate solutions.

A further object of the present invention is to provide a process for reducing the halide content of aqueous chromate solutions by subjecting said solutions to electrolysis in a diaphragm-less electrolytic cell.

These and other objects of the invention will become apparent to those skilled in the art from the description and claims that follow.

It has now been found that the halide content of an aqueous chromate solution may be reduced by subjecting said solution to electrolysis in a diaphragm-less electrolytic cell whereby at least a portion of the halide is converted to gaseous halogen which may be readily separated from the solution. More specifically, it has been found that the halide content of an aqueous solution containing up to 90 percent, preferably 40–90 percent, by weight chromate may be reduced by subjecting said solution to electrolysis in a diaphragm-less electrolytic cell at an anode current density of from 0.1 – 2.0 amperes per square inch.

DESCRIPTION OF THE PREFERRED EMBODIMENTS

By the term "soluble chromate" it is intended to refer to any water soluble chromate, bichromate or mixtures thereof, particularly the alkali metal and alkaline earth metal chromates and bichromates, such as sodium, potassium, lithium, calcium and magnesium chromates and bichromates. For the purpose of illustration and because of their greater commercial significance, particular reference will be made hereinafter to the alkali metal chromates, especially sodium bichromate. The chromate solutions treated according to the practice of this invention will generally be in the form of aqueous solutions containing up to about 90 percent by weight chromate, preferably 40 to 90 percent by weight. It will be understood that the various chromates have different solubilities and hence any stated range of concentration can only be considered as a generality. Thus, sodium bichromate solutions up to about 90 percent are possible while only about 51 percent sodium chromate solutions can be obtained at reasonable temperatures. Especially preferred at this time are solutions containing from 70–85 percent by weight sodium bichromate. Generally speaking, it is possible to remove significant quantities of halide from even extremely dilute chromate solutions, e.g., 10 percent aqueous solutions or less. It will be understood, however, that the efficiency of the process will increase with increasing chromate concentration since both the resistance to current passage and the solubility of the liberated halogen decrease with increased concentration. Therefore, while it is possible to electrolyze more dilute solutions, it has been observed that it is not usually economical to purify solutions of less than 40 percent chromate concentrations. Concentrations in excess of 90 percent, on the other hand, are inconvenient to handle because of the tendency of the chromate to crystallize out of solution at practical operating temperatures. It is especially preferred at this time that the chromate material be an alkali metal bichromate since the electrolytic process by which the present invention is carried into effect appears to be most efficient at the somewhat acidic pH at which bichromates exist.

The halides to be at least partially removed from the chromate solutions according to the practice of this invention include fluoride, chloride and bromide. It will be appreciated, of course, that the preponderant halide impurity will generally be chloride and for that reason specific reference will be made hereinafter to chloride and the gaseous product resultant upon its electrolysis, chlorine. While it will be understood that conditions of production and choice of raw materials will cause a variance in the chloride content of the chromate solution, generally speaking, commercially available products not treated in accordance with the present invention may have, for example, from 0.2 to 0.4 percent NaCl on a $Na_2Cr_2O_7 \cdot 2H_2O$ basis.

The practice of this invention is to be carried out in diaphragmless electrolytic cells, having solid anodes and cathodes, as opposed to liquid cathodes, e.g., mercury. The term "diaphragmless" is used to distinguish from diaphragm cells which have separate anolyte and catholyte compartments separated by a permeable diaphragm. The diaphragmless cells of the present invention, on the other hand, need only comprise a single electrolyte compartment having opposed, solid, relatively chemically inert, electrodes, means for applying electrical current to the electrodes and vent means for removing gaseous electrolysis products. A convenient material of construction for the anodes is platinum-coated titanium, whereas mild steel serves adequately as the cathode. Additionally, the anodes may be constructed, for example, of lead, lead peroxide on titanium or lead peroxide on graphite, the prime consideration being, of course, that the anode material be relatively inert in the electrolyte. The anode-cathode gap is preferably quite small, i.e., 0.15–0.5 inch, since the smaller this distance is the less resistance the cell has and consequently, the lower are the voltage requirements to achieve electrolysis. On the other hand, the anode-cathode gap cannot be too small since sufficient space is needed to adequately provide for release of the gas bubbles generated on the electrode surfaces which would otherwise interfere with the contact of the electrolyte, e.g., an aqueous sodium bichromate, with the anode surface.

In general, the applied voltage and anode current density used to carry the process of the present invention into effect will be dependent upon the end result desired. Thus, a broad range of practical anode current densities would be from 0.1 to 2.0 amperes per square inch. More specifically, if most efficient operation in terms of units of power consumed per equivalent of halide removed is the prime concern, at an electrode gap of from 0.15–0.5 inch and an applied voltage of 3–4.5 volts, an anode current density of from 0.3–0.9 amperes per square inch will be chosen. However, in another instance wherein anode material cost is the prime concern, a small anode surface area may be used at higher anode current densities thereby increasing power consumption but still obtaining an operation that is economically sound overall.

In operation, a quantity of impure liquor is pumped into the cell wherein it is electrolyzed, perhaps with agitation to facilitate the release of the chlorine gas and insure circulation of the liquor within the anode-cathode gap, until the required degree of purity is attained.

It will be understood from the foregoing that the basic concept of this invention involves the removal of the halide impurities from an aqueous chromate solution by electrolysis and, with the exception of the fact that the electrolytic cell should not contain a diaphragm, in order to facilitate the formation of hypochlorous acid and hence the oxidation of any trivalent chromium present, and that the electrodes should be solid, as opposed to, for example, a mercury cathode, this basic concept may be considered independent of any particular cell design or manner of operation. This is not to say, however, that such considerations are unimportant.

While it is possible to remove essentially one hundred percent of the halide content of the liquor being treated, in commercial practice such an operation may be impractical because of the excessive amount of electrical current that would be required to remove the last 10–20 percent of halide present. Obviously, a balance must be struck between the amount of halide to be removed and the cost, in terms of time and power requirements, of removing same. The design and operation of the cell to be used will then be dictated by these factors.

Thus, in one instance, where, for example, a high degree of chromate liquor purity with respect to the halide ion is required without regard for the cost of removing same, a batch process in a single electrolytic cell may be chosen. In this type of operation, a quantity of impure liquor is pumped into the cell wherein it is electrolyzed, perhaps with agitation to facilitate release of the chlorine gas and insure circulation of the liquor within the anode-cathode gap, until the required degree of purity is attained.

Further, the above described cell may be adapted for continuous operation simply by providing the cell with an inlet for impure liquor and a purified product outlet. The retention time of the cell, i.e., that time required for a volume of liquor to pass from inlet to outlet, is then regulated so that the liquor remains subject to electrolysis for a period of time sufficient to remove the desired amount of halide.

While the batch and continuous processes described above may be effectively used in the practice of the present invention, they are not the preferred processes for applying the invention to the production, on a commercial scale, of chromate liquors of reduced halide content.

The process preferred at this time is a continuous operation involving the use of a bank of multiple cells. In this operation a number of cells are connected in series with respect to both current and chromate liquor flow. Thus, as the liquor flows from cell to cell the halide content thereof is successively reduced, with the variables such as cell size, current density, flow rate, number of cells in the bank and the like being controlled to give a product having the desired degree of purity.

It has been observed that the temperature of the chromate solution being electrolyzed has no significant effect on the results obtained. Conveniently, a temperature of about 130°F. may be used since this is the temperature at which the liquor leaves the centrifuge following separation of the crystals in conventional sodium bichromate processes.

In order that those skilled in the art may more readily understand the present invention and various means by which it may be carried into practice the following illustrative examples are afforded.

EXAMPLE 1

To illustrate the batch-type operation of this invention in a single electrolytic cell, a cylindrical steel cell, the shell of which serves as the cathode of the cell, having a capacity of 5.3 liters, is used. The anode is a circular, conforming, foraminous, platinum-coated titanium screen (anode surface area 153 square inches) placed within the cell and spaced apart from the cell walls by a distance of 0.375 inch. The cell is fitted with a mechanical stirrer and is open on top to allow the gaseous chlorine to escape. To evaluate the batch process at various anode current densities, a number of runs are made using 5,300 milliliters of 70 percent by weight sodium bichromate at a temperature of 200°F. Other conditions and the results obtained are presented in Table I.

TABLE I

| Anode current density | Volts | Wt. percent original NaCl | Time electrolyzed (hrs.) | Current efficiency | Percent NaCl removed |
|---|---|---|---|---|---|
| 0.163 amperes/square inch (a.s.i.) | 2.8 | 0.376 | 0.25 | 16.3 | 13.2 |
| | | | 0.50 | 15.6 | 25.2 |
| | | | 1.00 | 11.8 | 38.2 |
| | | | 1.50 | 11.5 | 56.2 |
| | | | 2.00 | 10.2 | 66.2 |
| | | | 3.00 | 9.4 | 92.0 |
| | | | 4.00 | 7.6 | 98.0 |
| 0.326 a.s.i. | 3.4 | 0.380 | 0.25 | 35.9 | 41.6 |
| | | | 0.50 | 24.7 | 57.2 |
| | | | 1.00 | 16.3 | 75.5 |
| | | | 1.50 | 12.4 | 86.5 |
| | | | 2.00 | 10.3 | 94.5 |
| | | | 2.50 | 8.6 | 99.2 |
| | | | 3.00 | 7.2 | 99.8 |
| 0.489 a.s.i. | 3.7 | 0.377 | 0.25 | 28.5 | 49.8 |
| | | | 0.50 | 19.0 | 66.2 |
| | | | 1.00 | 12.2 | 84.6 |
| | | | 1.50 | 9.1 | 94.6 |
| | | | 2.00 | 7.1 | 99.4 |
| 0.652 a.s.i. | 4.1 | 0.269 | 0.25 | 25.1 | 56.6 |
| | | | 0.50 | 15.5 | 72.2 |
| | | | 0.75 | 11.7 | 81.9 |
| | | | 1.00 | 9.8 | 90.4 |
| 0.978 a.s.i. | 4.8 | 0.269 | 0.25 | 11.0 | 53.9 |
| | | | 0.50 | 7.7 | 75.5 |
| | | | 0.75 | 5.9 | 87.5 |
| | | | 1.00 | 4.9 | 97.0 |

Table II shows the time to effect a 90 percent reduction in the amount of sodium chloride originally present in the bichromate solution using various applied anode current densities. The current efficiency of each operation is also indicated.

TABLE II

| Anode Current Density | Time (Hours) | Current Efficiency (%) |
|---|---|---|
| 0.163 a.s.i. | 2.90 | 9.5 |
| 0.326 a.s.i. | 1.70 | 11.5 |
| 0.489 a.s.i. | 1.25 | 10.5 |
| 0.652 a.s.i. | 1.00 | 9.5 |
| 0.918 a.s.i. | 0.83 | 5.5 |

From this data, especially the current efficiency ratings shown in Table I, it becomes apparent that using applied anode current density values ranging from approximately 0.3 to approximately 0.7 amps per sq. in. an efficient and effective reduction in the chloride content of the bichromate liquor is obtained.

EXAMPLE 2

This example shows the adaptation of the instant invention to a continuous, single cell operation. The cell itself is as in Example I except that it is provided with an inlet for the impure bichromate liquor and an outlet for the purified product. The same 70 percent, 200°F. liquor as in Example 1 having a NaCl content of 0.38 percent is used. Table III presents the remaining conditions and results obtained.

TABLE III

| Anode Current Density | Volts | Retention Time (Hours) | Percent NaCl Removed |
|---|---|---|---|
| 0.163 | 2.75 | 2 | 44.1 |
| 0.163 | 2.75 | 4 | 55.0 |
| 0.163 | 2.75 | 6 | 67.3 |
| 0.489 | 3.6 | 0.5 | 40.6 |
| 0.489 | 3.6 | 1 | 58.6 |
| 0.489 | 3.6 | 2 | 82.2 |

EXAMPLE 3

This example illustrates the use of a bank of multiple electrolytic cells in the practice of the present invention. Rather than actually constructing a multiple cell setup, a single 440 milliliter cell is operated to simulate a multiple cell bank. This is done by running an entire given quantity of 70 percent by weight sodium bichromate liquor, at a temperature of 130°F. and having a NaCl content as indicated below, through the cell, collecting the cell effluent and recycling same through the cell for a number of cycles, the number of cycles then corresponding to the number of cells in the bank. The cell, rectangular in design, has a steel cathode and the anode consists of a sheet of solid titanium having a platinum coating on the surface thereof. The anode area is 72 square inches and the electrode gap is 0.31 inch. Flow rate of the bichromate liquor through the cell is 400–500 milliliters per minute. Table IV shows the cumulative percent NaCl removed from the original liquor after passing through a stated number of electrolytic cycles. The run conducted at 0.325 asi. anode current density uses a bichromate liquor having an original NaCl content of 0.205 percent by weight whereas the 0.486 asi. run uses a liquor containing 0.258 percent NaCl.

TABLE IV

| Number of Cycles | NaCl Removed Percent 0.325 asi. | 0.486 asi. |
|---|---|---|
| 5 | 32.6 | 39.4 |
| 10 | 54.0 | 59.5 |
| 15 | 64.9 | — |
| 20 | 74.2 | — |
| 30 | 84.8 | 84.0 |

From this table it can be seen that an effective reduction in the chloride content of alkali metal bichromate liquors is obtained using the described, simulated, multiple cell bank. Moreover, this operation, from a standpoint of economics, i.e., power consumption per unit of chloride removed, is superior to those previously described herein and is commercially practical and practicable.

EXAMPLE 4

To show the effectiveness of the practice of the present invention in reducing the halide content of a sodium chromate solution, 3,380 ml. of a solution containing 51 percent by weight of $Na_2CrO_4$ is electrolyzed in a cell as described in Example 1. The solution has an original sodium chloride content of 0.55 percent by weight and is at a temperature of 195°F. Electrolysis is effected at 3.7 volts and an anode current density of 0.325 amperes per square inch until, at the end of 1, 3, 4 and 5 hours, 21, 46, 55 and 64 percent, respectively, of the NaCl have been removed.

EXAMPLE 5

Illustrating that even very dilute sodium bichromate solutions may be successfully treated, a 10 percent solution is electrolyzed in a simulated 5 cell bank (as in Example 3) at 0.325 amperes per square inch. After these 5 cycles, the NaCl content is reduced from its original level of 0.035 percent to 0.020 percent, a 42 percent reduction.

EXAMPLE 6

An 85 percent sodium bichromate solution is electrolyzed in a simulated 4 cell bank at a temperature of 180°F., a voltage of 3.7 and an anode current density of 0.325 amperes per square inch. After the 4 cycles are completed the NaCl content is reduced from 0.282 percent to 0.219 percent, a 22 percent reduction.

It will be understood that although the invention has been described in terms of specific embodiments thereof, it is not to be so limited since certain alterations may be made therein which are within the full and intended scope of the claims as appended.

We claim:

1. A process for reducing the halide content of an aqueous bichromate solution which comprises subjecting said solution to electrolysis in a diaphragm-less electrolytic cell whereby at least a portion of said halide is converted to gaseous halogen and subsequently liberating said gaseous halogen from said solution.

2. A process as in claim 1 wherein the aqueous bichromate solution contains up to 90 percent by weight of bichromate and the electrolysis is conducted at an anode current density of from 0.1–2.0 amperes per square inch.

3. A process as in claim 1 wherein the aqueous bichromate solution contains from about 40–90 percent by weight of bichromate and the electrolysis is conducted at an anode current density of from 0.3–0.9 amperes per square inch.

4. A process as in claim 1 wherein the aqueous bichromate solution is an aqueous sodium bichromate solution.

5. A process for reducing the halide content of an aqueous bichromate solution which comprises subjecting said solution to electrolysis in a bank of multiple cells of the diaphragm-less electrolytic type, connected in series with respect to both solution and current flow, whereby a portion of the halide is converted in each cell of the bank of multiple cells to halogen and subsequently liberating said halogen from said solution thereby successively reducing the halide content of the bichromate solution.

6. A process as in claim 5 wherein the aqueous bichromate solution contains up to 90 percent by weight of bichromate and the electrolysis is conducted at an anode current density of from 0.1–2.0 amperes per square inch.

7. A process as in claim 5 wherein the aqueous bichromate solution contains from about 40–90 percent by weight of bichromate and the electrolysis is conducted at an anode current density of from 0.3–0.9 amperes per square inch.

8. A process as in claim 5 wherein the aqueous bichromate solution is an aqueous sodium bichromate solution.

* * * * *